(No Model.) 4 Sheets—Sheet 2.
S. CASE.
AUTOMATIC GRAIN SCALE.
No. 370,316. Patented Sept. 20, 1887.
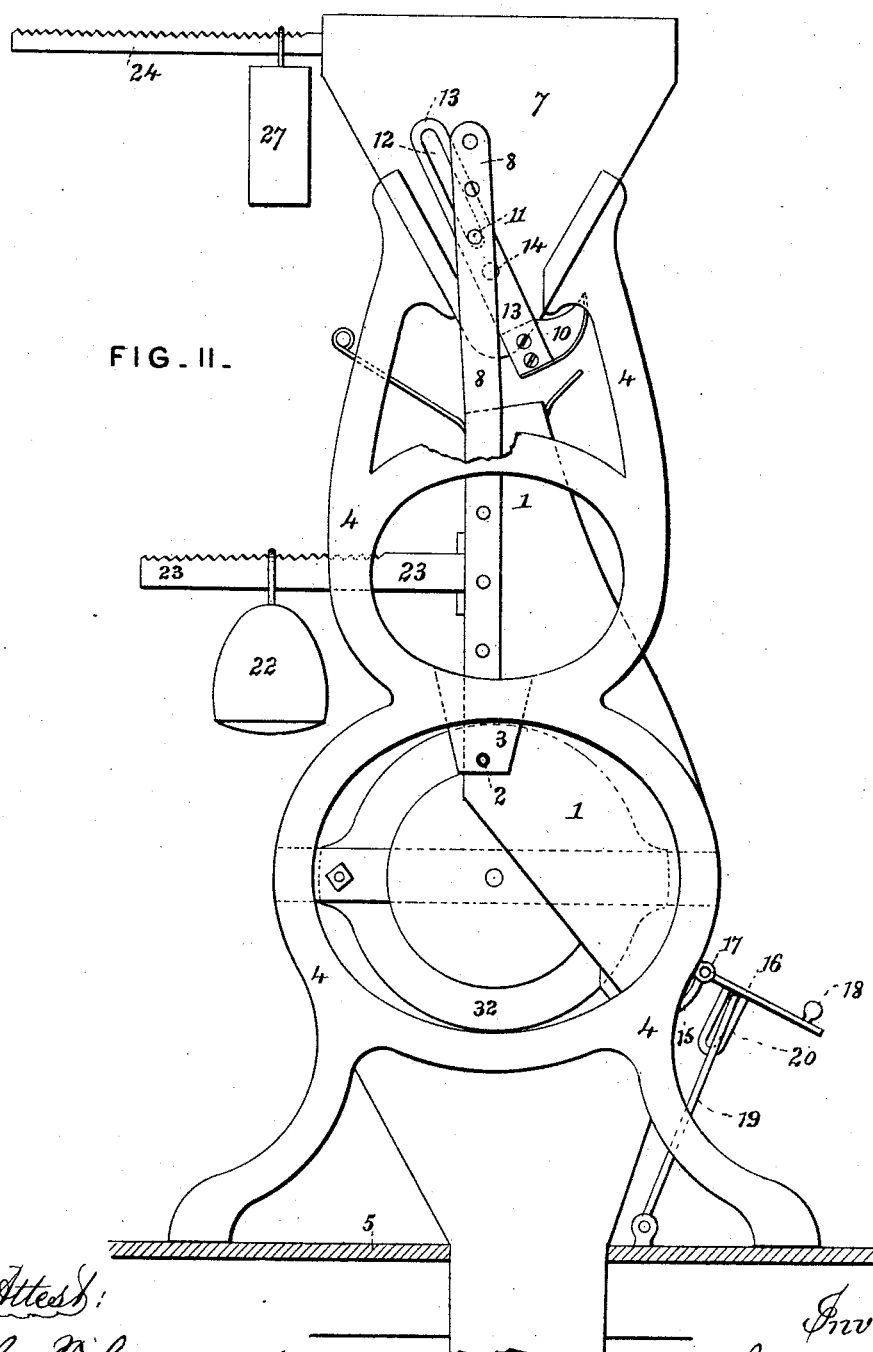
FIG. II.
Attest:
Geo. T. Smallwood.
H. S. Knight.
Inventor:
Sharon Case
By Knight Bros. Attys

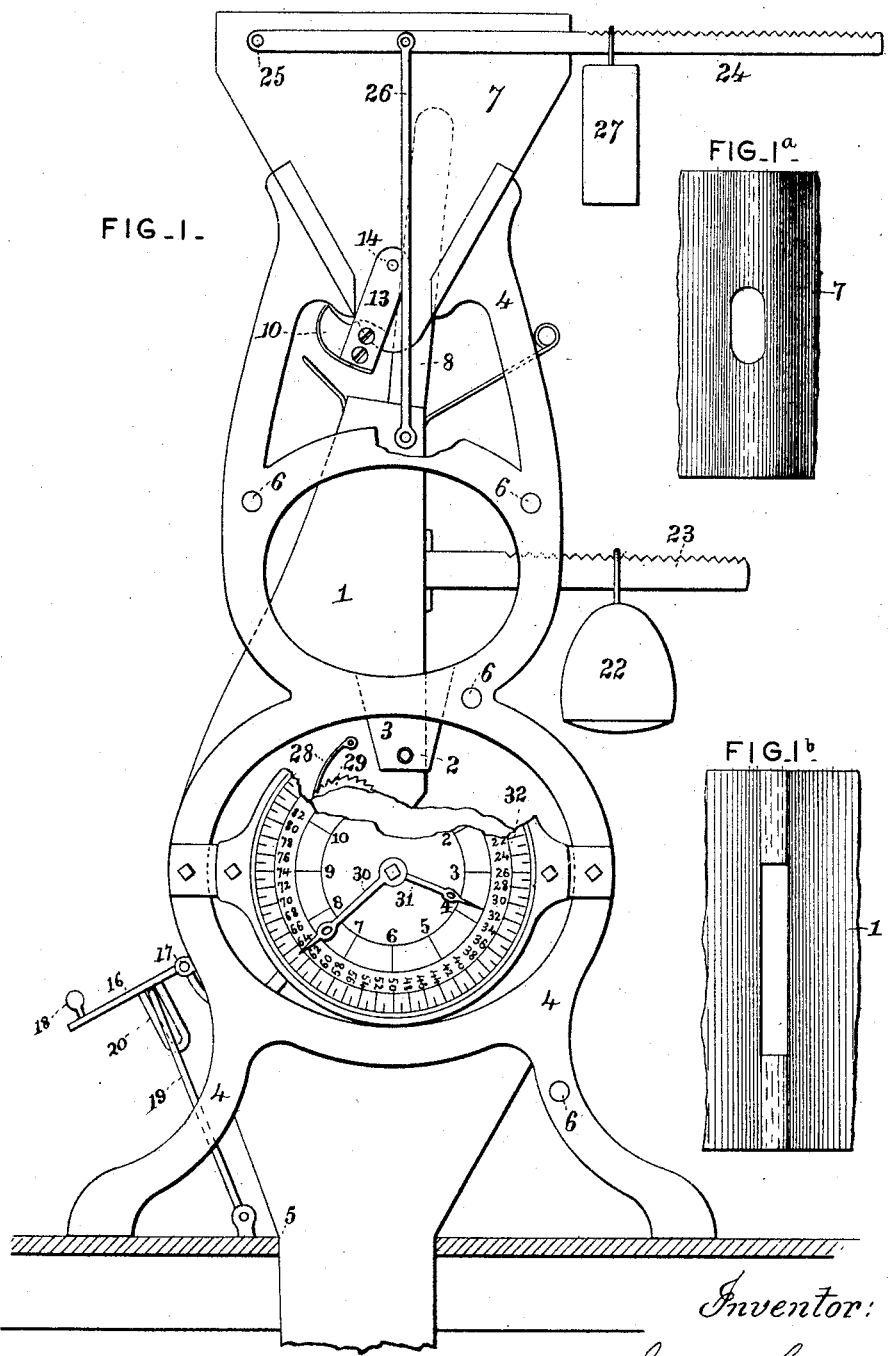

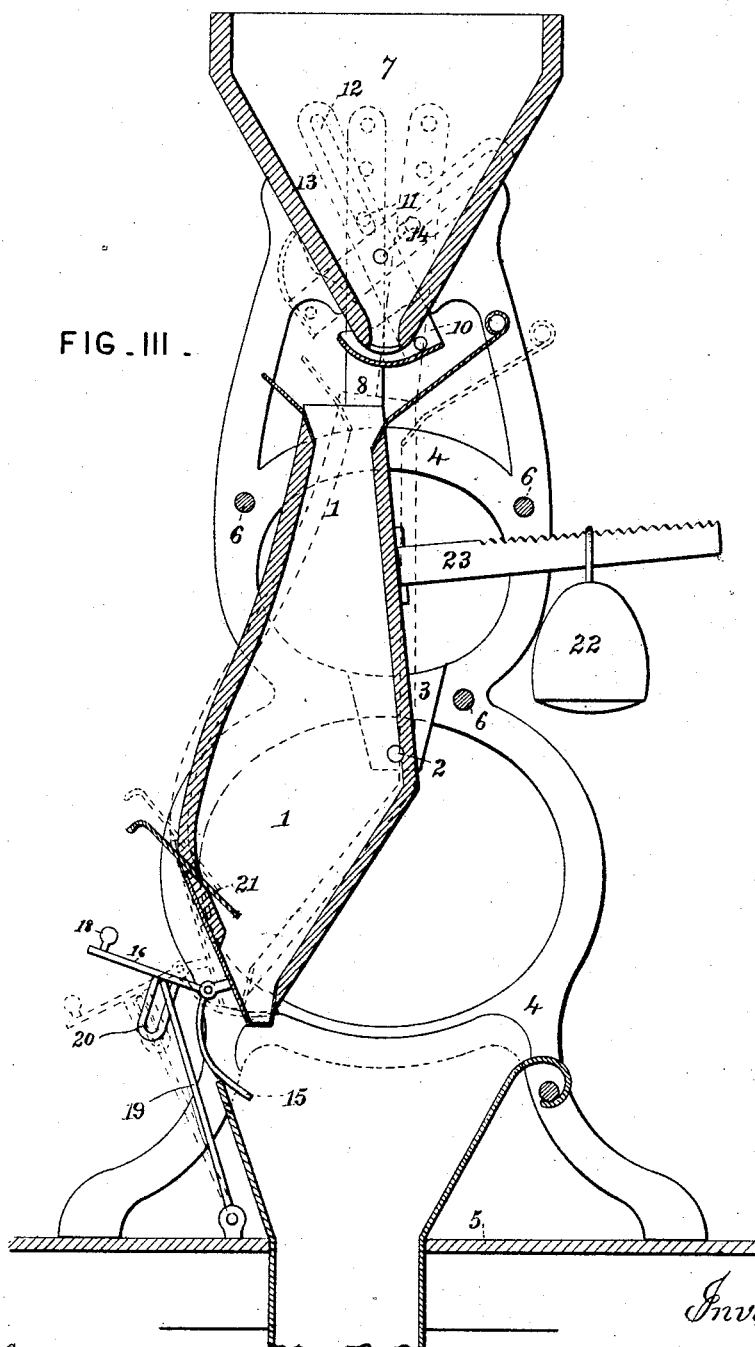

(No Model.) 4 Sheets—Sheet 4.
S. CASE.
AUTOMATIC GRAIN SCALE.
No. 370,316. Patented Sept. 20, 1887.
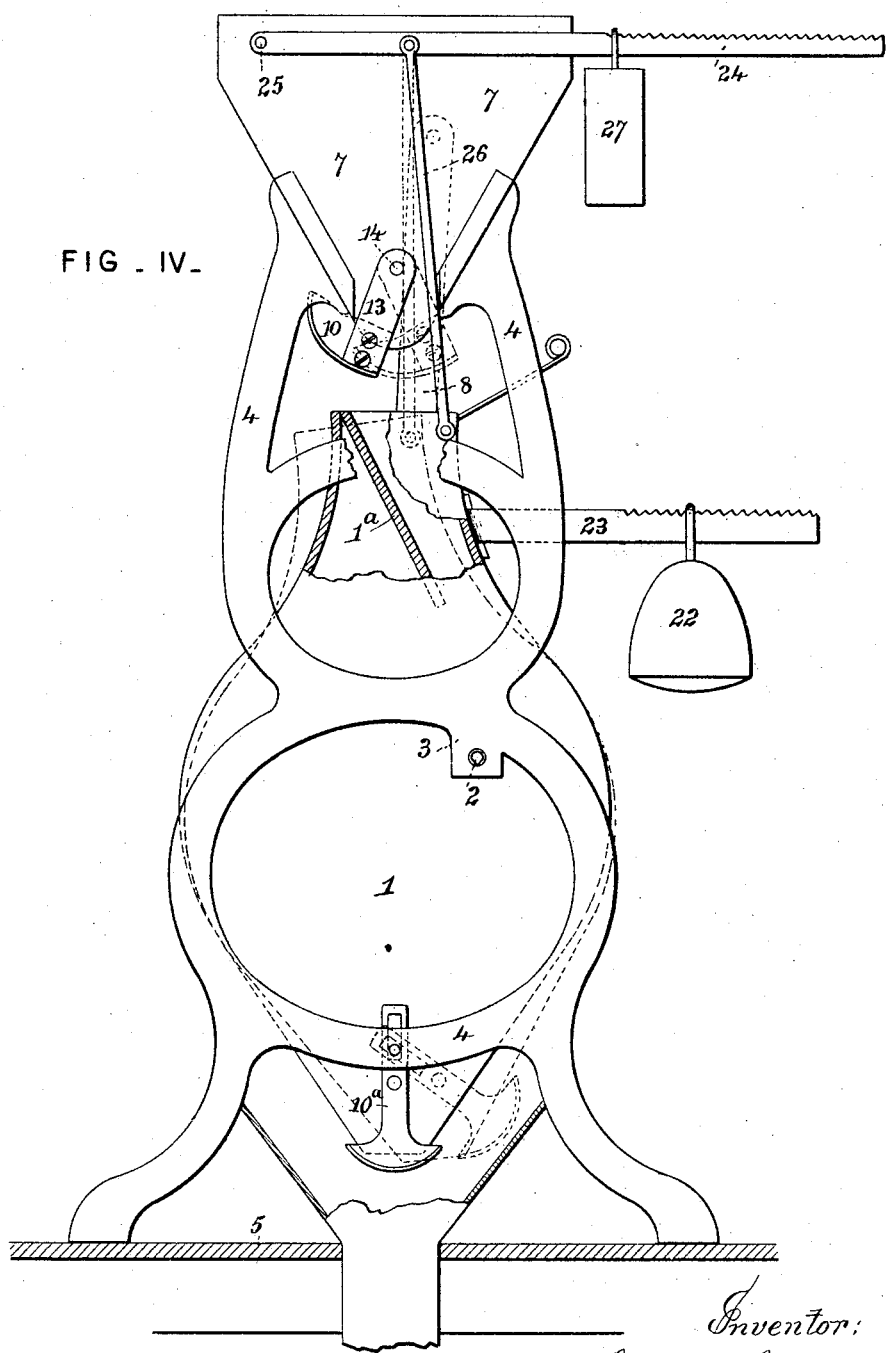
FIG. IV.

UNITED STATES PATENT OFFICE.

SHARON CASE, OF MONTEZUMA, INDIANA.

AUTOMATIC GRAIN-SCALES.

SPECIFICATION forming part of Letters Patent No. 370,316, dated September 20, 1887.

Application filed July 21, 1886. Serial No. 208,596. (No model.)

*To all whom it may concern:*

Be it known that I, SHARON CASE, a citizen of the United States, residing at Montezuma, in the county of Parke and State of Indiana, have invented a new and useful Improvement in Grain Weighers and Registers, of which the following is a specification.

My improvement relates to a machine adapted to continuously weigh and register the amount of weight of grain falling through a spout; and to this end it consists of certain details of construction, which will be first fully described with reference to the accompanying drawings, and then pointed out in the claims.

In the said drawings, Figure I is a front elevation of my improved grain weigher and register, portions of the machine being broken away to exhibit parts of the interior. Fig. I$^a$ is a bottom view of the hopper. Fig. I$^b$ is a bottom view of the weighing-chamber. Fig. II is a rear elevation thereof, a portion of the frame being broken away. Fig. III is a vertical section in a plane parallel with the dial, the weighing-chamber being shown in position for discharging the grain in full lines and for receiving the grain in broken lines. Fig. IV is an elevation illustrating modified form of weighing-chamber and valve.

In my grain-weigher but a single weighing-chamber, 1, is employed, and is supported by trunnions 2 in brackets 3, pendent from the side frames, 4. The frames 4, with the base 5, support the whole mechanism of the grain weigher and register, and the former are held rigidly together by cross-braces 6. At top the side frames, 4, support a hopper, 7, which receives a continuous supply of grain from any suitable source. The discharge-aperture in the bottom of hopper 7 is shown in Figs. I$^a$ and III, and is immediately over the pivotal axis of the weighing-chamber 1, so that the momentum of the grain falling into the weighing-chamber will not disturb the center of gravity of said chamber. The chamber is enlarged to one side of its pivotal axis, so that the grain gradually filling it will shift its center of gravity and finally cause it to turn upon its pivots. As the chamber turns, an arm, 8, rigid therewith, oscillates a cut-off, 10, by means of a pin, 11, engaging in a slot, 12, in the arm 13, carrying one end of said cut-off. At each side of the hopper 7 the arms 13 are pivoted at 14. The pin 11 is adjustable upon the arms 8 and 13, so as to allow of the varying of the movement of the cut-off as desired. This mechanism insures the stoppage of the flow of the grain as soon as the weighing-chamber has attained its sufficient load and drops into position for the discharge thereof.

When the weighing-chamber is in its normal position and receiving grain, its lower end is kept closed by a valve, 15, preferably of the represented curved shape. In this position the valve is held up against the discharge-opening of the weighing-chamber by an arm, 16. Studs 17, projecting from the side of the weighing-chamber, provide pivotal points for this valve. The arm 16 may be raised by means of a hand-piece, 18, by which it is weighted, so as to permit the grain to flow from the weighing-chamber at any time; but said arm is automatically lifted when the weighing-chamber falls into the discharging position shown in Fig. III, by being brought into contact with the yoke 19, hinged to the base 5, so that all obstruction to the exit of the grain is removed. The arm 16 is prevented from too free upward movement by a link, 20, through which the yoke 19 passes.

In the ordinary grain-scale some irregularity in weighing is caused by the rapidity with which the weighing operation is performed, the amount of grain falling through the spout in a given time being regulated by valves above the scale. My improvement, however, operates with equal accuracy, whatever the rapidity of flow of the grain, not only by reason of the receiving of the grain upon the pivotal axis of the weighing-chamber, but because the rapidity of flow is governed by an attachment upon the weighing-chamber itself. This consists of a slide, 21, moving in the side of the weighing-chamber, and arranged to close to a greater or less degree the discharge-aperture, according to the desired speed of working of the machine.

The weight of grain received and discharged by the weighing-chamber at each operation is regulated by a weight, 22, hung upon a scale-beam, 23, rigid with the weighing-chamber. With the provision of a single weight thus arranged it will be seen that the machine would be imperfect in operation, the weighing-chamber being returned to filling position each time as soon as the weight 22 overbalanced the weight of the weighing-chamber and the grain therein without waiting for all of the grain to be discharged. I have therefore provided an additional scale-beam, 24, pivoted at 25 to the hopper and supported by a rod, 26, pivoted to the upper end of the weighing-chamber. This scale-beam carries also a movable weight, 27. The rod 26 and line of pressure are preferably vertically above the pivotal axis of the weighing-chamber, so that when such chamber falls it does not raise the scale-beam 24, but carries the latter with it in its fall. In this manner the weight 27, as soon as the line of its pressure is removed from directly over the pivotal axis of the weighing-chamber, tends to retain such weighing-chamber in its discharging position until the required amount of grain is discharged. The ordinary way of working the scale is to have the weight 27 but slightly overbalanced by the weight 22, so that the weighing-chamber will be returned to loading position when all the grain has been discharged therefrom; but, if desired, the weight 27 may be adjustable, or a smaller weight may be employed, so that the weight 22 will overbalance the weighing-chamber and the weight 27 while there yet remains a portion of grain in such chamber. This latter is the more accurate method of weighing, for by leaving a small amount in the weighing-chamber after each discharge the machine becomes more automatic in its operation, any additional amount of grain flowing in at one oscillation being made up for by decreased flow in the next.

In Fig. IV, I show a modified form of weighing-chamber having a deflector, 1ª, for directing the inflowing grain toward the pivotal axis. This chamber has a valve, 10ª, pivoted thereto for controlling the discharge-opening, provided with a slotted arm engaging a stud on the frame of the machine. The discharging positions of this chamber and valve are indicated in broken lines.

At each oscillation of the weighing-chamber it is desirable that the whole number of oscillations be indicated on a suitable dial. I have supposed a grain-scale in which each oscillation will weigh and deliver one peck of grain—or, in other words, four oscillations will be necessary in order to weigh and indicate one bushel or sixty pounds of wheat. To this end I mount upon the weighing-chamber a spring-pawl, 28, which engages with a ratchet-wheel, 29, carried by one of the side frames, 4, and connected by a train of gear with the fast and slow hands 30 31, which travel over a dial, 32. The relative speeds of the hands 30 31 may be changed as desired. Preferably, however, it is in the proportion of one hundred to one, the long hand indicating the number of single bushels and the short hand the number of one hundred bushels.

Having thus described my invention, the following is what I claim as new therein and desire to secure by Letters Patent:

1. In combination with an oscillating weighing-chamber, a weight having pivotal connection with said weighing-chamber and adapted to hold said weighing-chamber in discharging position, substantially as set forth.

2. In combination with a pivoted weighing-chamber and a weight hung thereon, a second weight having pivotal connection with said weighing-chamber and adapted to act in opposition to the first-named weight when said chamber is in discharging position, substantially as set forth.

3. In combination with a weighing-chamber having pivotal support at one side and a scale-beam and weight hung on said side, a second weight-beam pivoted to a fixed support, and a rod connecting said weight-beam to said weighing-chamber vertically above the pivotal axis of the weighing-chamber.

4. In combination with a pivoted weighing-chamber having counterbalance-weight, substantially as described, and a spout or hopper for feeding the grain into said weighing-chamber, a cut-off valve having an arm by which it is pivoted to said spout or hopper, and an arm rigid with said weighing-chamber, and having slot and adjustable pin connection with the arm on said cut-off valve above its pivot, substantially as and for the purposes set forth.

5. In combination with a pivoted weighing-chamber having counterbalance-weight, a spout or hopper for feeding grain to said weighing-chamber, a cut-off valve having arms by which it is pivoted to said spout or hopper, an arm projecting from said weighing-chamber, and a pin adjustable on the arm of the weighing-chamber and entering a slot on an arm of the cut-off valve above the pivot of the latter for connecting the two together, substantially as set forth.

6. In combination with a laterally-swinging weighing-chamber having counterbalance-weight, a cut-off valve pivoted to the lower end thereof, an arm on said valve for closing the latter, and a suitable stop for holding up the arm and opening the valve when the weighing-chamber falls to discharging position, substantially as set forth.

7. In combination with a weighing-chamber and a cut-off valve at the lower end thereof having a suitable projecting arm for closing the valve, a yoke hinged to the base of the machine and having link-connection with said arm for holding up the arm to open the valve as the weighing-chamber falls, substantially as set forth.

SHARON CASE.

Witnesses:
C. N. SHOUGH,
E. D. ANDERSON.